United States Patent [19]

Blaho

[11] Patent Number: 4,682,921

[45] Date of Patent: Jul. 28, 1987

[54] INSIDE-TUBE SCARFING TOOL

[75] Inventor: Lester J. Blaho, Ambridge, Pa.

[73] Assignee: Pittsburgh Tube Company, Monaca, Pa.

[21] Appl. No.: 796,650

[22] Filed: Nov. 8, 1985

[51] Int. Cl.⁴ .............................................. B23D 1/08
[52] U.S. Cl. .................................... 409/299; 29/33 D
[58] Field of Search .................. 409/299, 143; 408/77; 29/33 D

[56] References Cited

U.S. PATENT DOCUMENTS

| | | | |
|---|---|---|---|
| 2,243,197 | 5/1941 | De Fiore | 409/299 |
| 2,778,281 | 1/1957 | Allardt | 409/299 |
| 3,352,208 | 11/1967 | Thomas et al. | 409/299 |
| 4,383,786 | 5/1983 | Paton et al. | 409/299 |
| 4,440,533 | 4/1984 | Götting et al. | 409/299 |

FOREIGN PATENT DOCUMENTS 0062709  5/1981  Japan ..................... 409/299

Primary Examiner—Z. R. Bilinsky
Attorney, Agent, or Firm—Reed Smith Shaw & McClay

[57] ABSTRACT

A scarfing tool for scarfing the inside of a tube-like member in which an elongated body is adapted for attachment to the end of an impeder rod. The body includes a cutting tool and a pair of spaced apart rollers aligned with the cutting tool. A thrust roller is pivotably mounted to the side of the body opposite from the cutting tool and rollers to force the cutting tool against the inner area of the tube member to be scarfed. A pair of first and second hydraulic means having associated pistons which are connected to a common source of hydraulic fluid. The first hydraulic piston is operably connected to said thrust roller for actuating said roller into extended contact with the inner tube member and the second piston is operably connected to a bias means to work against said means as the thrust roller is extended by the first hydraulic piston.

6 Claims, 9 Drawing Figures

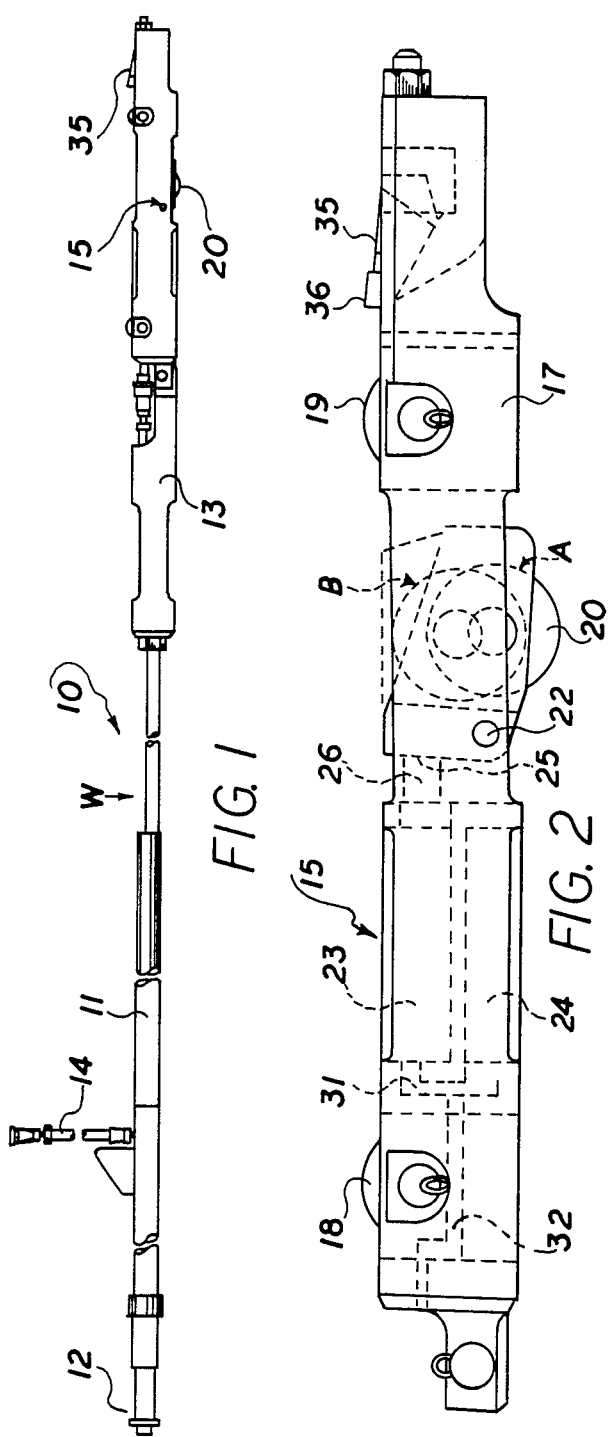

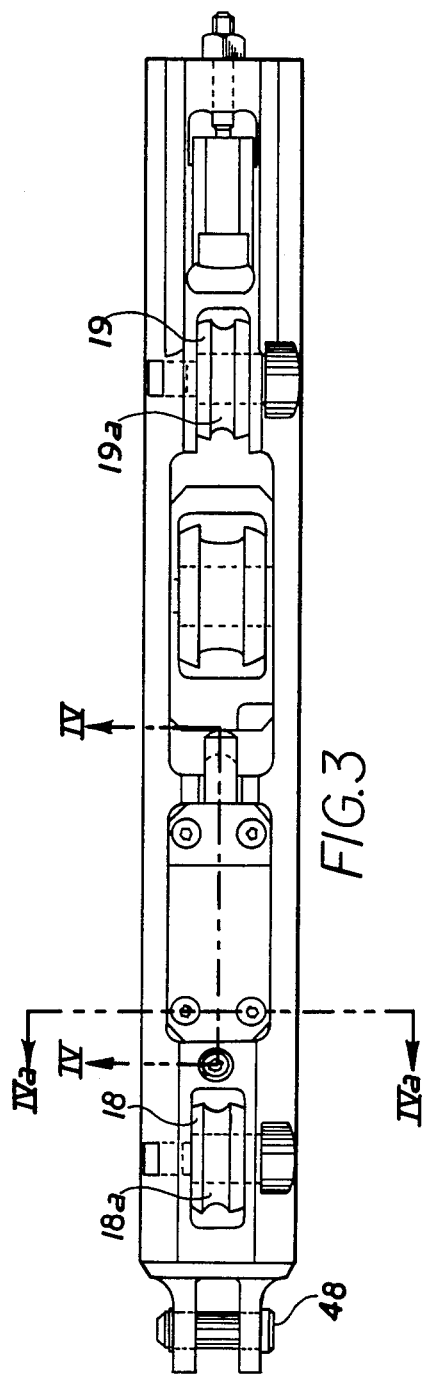
FIG.3
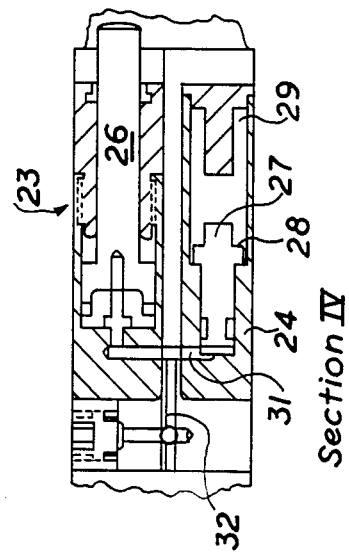
FIG. 4
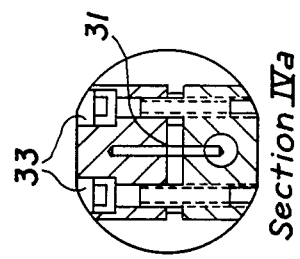
Section IVa

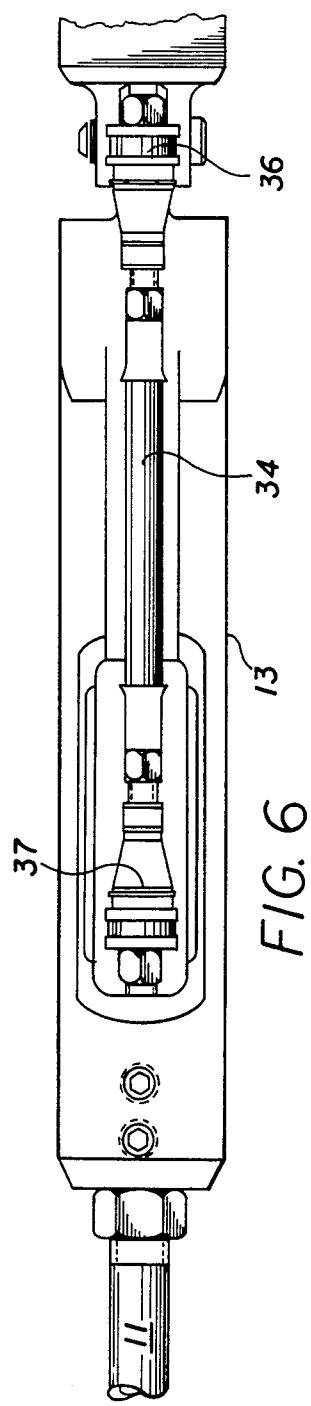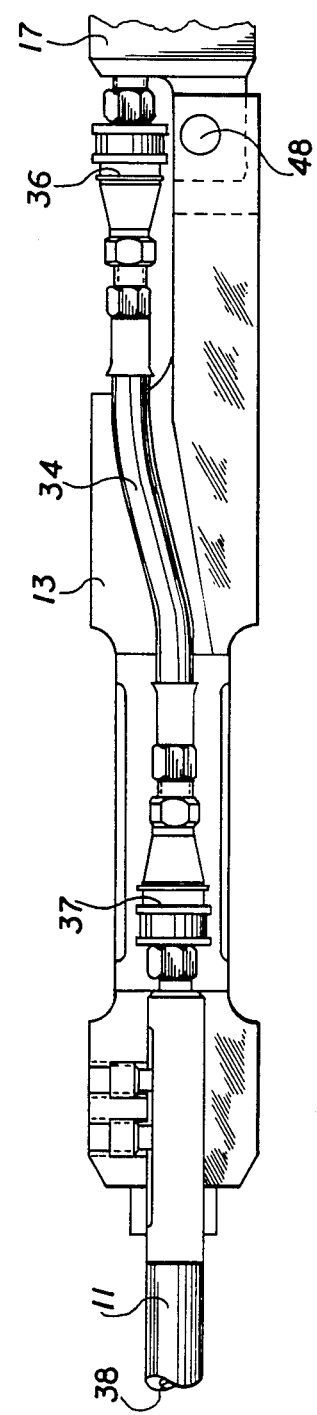
FIG. 6
FIG. 5

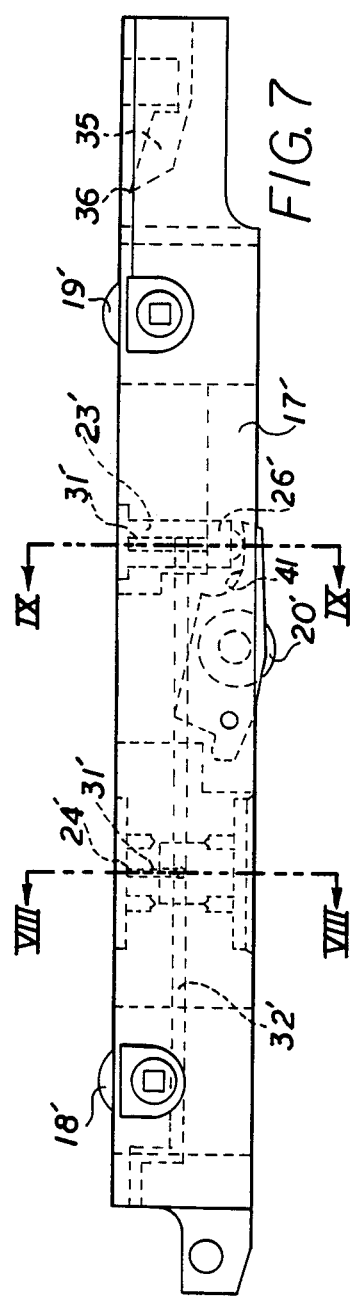
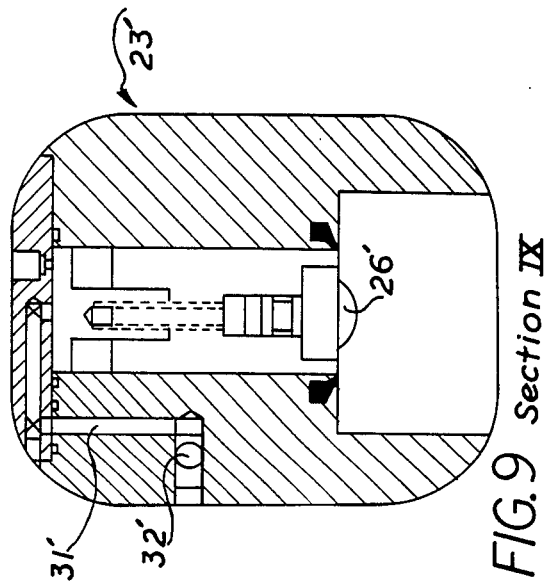
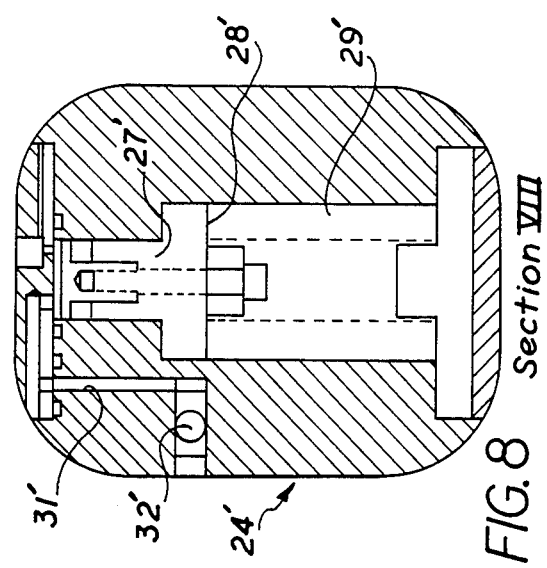

INSIDE-TUBE SCARFING TOOL

FIELD OF THE INVENTION

The present invention relates to scarfing tool for scarfing the inside weld of a tube, and, in particular, relates to a hydraulic scarfing tool which provides substantially increased accuracy in removing excess weld bead within a welded tube.

BACKGROUND OF THE INVENTION

In the manufacture of welded tubes, a bead is formed along the inside of the tube weld which must be removed. It is particularly desirable to achieve a removal that renders the bead indistinguishable from the inner diameter of the remainder of the tube. This is especially desirable where the tube will be reduced in diameter (and increased in length) for critical applications or a very smooth round surface is required with a minimum of machining (e.g., to be used for hydraulic cylinders).

It has been generally well known in these applications to use an inner diameter scarfing tool. These tools can take various forms, but the most useful are the mechanical and hydraulic scarfing tools which ride at the end of an impeder rod on rollers. The rollers are adjusted so that their contact with the inner walls of the tube provides alignment been the weld bead and the cutting tool mounted on the back end of the tool. Typically, the rollers have been preadjusted before scarfing to remove the optimum amount of bead.

In mechanical systems it is difficult to maintain the tolerances in the amount of removal because of cutting tool wear, variation of the strip thickness, and other out-of-adjustments that occur during the scarfing operation. More importantly, it is very difficult for mechanical tools to compensate for variations in the tube diameter or rough areas which the tool may encounter, e.g., butt welds, To overcome these difficulties, hydraulic tools were devised so that the application of pressure on one of the rollers would provided the compensation necessary to overcome the natural wear of the cutting tool, misadjustments or strip thickness.

While the hydraulic scarfing tools have provided a higher degree of precision to weld removal accuracy, they do not quickly adapt to abrupt changes in the inner diameter of the tube or provide the degree of accuracy needed for very severe tolerance specifications. Accordingly, it is an object of the present invention to provide an improved hydraulic scarfing tool which overcomes the limitations of the past tools and provides extremely fast response times and tight tolerances.

SUMMARY OF THE INVENTION

Generally the present provides a hydraulic scarfing tool having a first hydraulic means in which the piston is positioned to contact a thrust roller means which rides in the tube 180° from the bead and exert pressure thereon. The pressure exerted on the roller causes the cutting tool to engage and remove the inner weld bead. In hydraulic communication with the first hydraulic means is a second hydraulic means which includes a piston biased against the source of hydraulic fluid.

In a preferred embodiment of the invention, the first and second hydraulic means are positioned in tandem to afford proximate fluid communication. In this embodiment, the first hydraulic piston is actuated in a direction parallel to the action of the cutting tool and the movement of the tube. The positioning of the first and second hydraulic means facilitates their modular construction for ease of assembly and repair as well as minimizes the need for long hydrualic fluid runs.

In another embodiment, the first and second hydraulic means are positioned apart from each other and connected by a hydraulic passageway. In this embodiment, it is desirable to position the thrust roller between the two hydraulic means to obtain the best location and balance for the tool. While not preferred, this embodiment affords a simplified way to retrofit existing scarfing tools by providing the novel first and second hydraulic means.

The hydraulic scarfing tool of the present invention overcomes many of the limitations in prior art tools, especially with respect to reaction time and removal precision. Other advantages of the invention will become apparent from a perusal of the following detailed description of presently preferred embodiments of the invention taken in connection with accompanying drawings.

BRIEF DESCRIPTION OF THE DRAWINGS

FIG. 1 is a side elevation of a hydraulic scarfing tool of the present invention mounted to a hydraulic impeder rod;

FIG. 2 is a side elevation of the scarfing tool of the present invention disconnected from the impeder adapter rod;

FIG. 3 is a top view of the scarfing tool shown in FIG. 2;

FIG. 4 is a sectional elevation of the first and secnd hydraulic means taken along lines IV—IV;

FIG. 4a is a cross-section taken along lines IVa—IVa of FIG. 3;

FIG. 5 is a top elevation of the impeder rod adapter;

FIG. 6 is a side elevation of the impeder rod adapter;

FIG. 7 is a side elevation of another embodiment of scarfing tool of the present invention;

FIG. 8 is a sectional elevation of the scarfing tool taken along line VIII—VIII on FIG. 7; and FIG. 9 is a sectional elevation taken along line IX—IX of FIG. 7.

PRESENTLY PREFERRED EMBODIMENTS

Referring to FIG. 1, an inner tube scarfing tool 10 is shown. Generally, it comprises an impeder rod 11 which is pivotally connected by pivot connector 12 to a tube forming mill, which is not shown. At its other end is rod adapter 13 and scarfing tool 15 of the present invention. A hydraulic line 14 is connected to impeder rod 11 for hydraulic fluid connection to scarfing tool 15. In a typical operation, strip metal is fed from a roll in the direction of connector 12 to tool 15. During its travel, it is in contact with rollers which bend the strip so that its lengthwise edges are brought into contact at a point W. At point W, a welder joins the two edges to form a tube. However, the bead of the weld normally projects into the tube creating a discontinuity of the inner surface which must be removed for most applications.

In order to remove the inner bead, a tungsten, carbide or ceramic cutting tool is positioned at the end of the scarfing tool. Referring to FIGS. 2 and 3, scarfing tool 15 of the present invention is shown. Tool 15 comprises an elongated body 17 preferably machined from an alloy tool steel, such as Hyten B3x. Tool 15 includes first and second rollers 18 and 19, respectively, First and second rollers 18 and 19 are position to ride within the tube in juxtaposition with the weld bead. Preferably, both rollers include a center groove 18a and 19a, respectively, which permits the bead to avoid contact with the roller.

A thrust roller 20 is pivotably mounted to body 17 by pivot means 22. Thrust roller 20 is oppositely positioned from first and second rollers 18 and 19 and is adapted to push tool 15 against the tube and the first and second rollers. Thrust roller 20 pivots between first and second positions A and B, respectively as shown by dotted line in FIG. 2. At position A, roller 20 is positioned at its maximum extension to force rollers 18 and 19 tightly against the inner surface of the tube. At position B, roller 20 is withdrawn into tool 15 by means of the weight the tool.

Tool 15 also includes first and second hydraulic means 23 and 24, respectively, for actuating thrust roller 20 between positions B and A. Referring more particularly to FIG. 4, first hydraulic means 23 includes first piston 26 which is positioned to contact thrust plate 25 of thrust roller 20. Second hydraulic means 24 includes second piston 27 having circumferential flange 28 which is in biased contact with spring 29. First and second hydraulic means 23 and 24 are in fluid contact with a source of hydraulic fluid by means of common passageway 31 which is connected to hydraulic line 32.

Hydraulic pressure in line 32 causes first piston 26 to push against thrust plate 25 causing thrust roller 20 to pivot from position B to position A. At the same time second piston 27 is pushed against spring 29. Spring 29 is preferably selected to provide sufficient bias against piston 27 to prevent it from fully compressing spring 29 when maximum hydraulic pressure is exerted against piston 26. When thrust roller 20 is in position A, cutting tool 35 and its associated tip 36 is positioned against the weld bead for removal thereof.

As can be seen from FIGS. 2-4, the first and second hydraulic means are positioned in tandem and are secured within tool 17 by means of bolts 33. First and second hydraulics means are connected to a source of hydraulic fluid by means of fluid line 32 which is connected to line 34 in adapter rod 13 by coupling 36. Hydraulic line 34 is, in turn, connected to line 38 which runs internally of impeder rod 11. Line 38 is connected to linen 34 by means of coupling 37 and to hydraulic source line 14 preferably by means of a quick disconnect type coupling, not shown.

In the preferred embodiment described above, the operation of the scarfing tool is controllable by controlling the hydraulic pressure to hydraulic means 23 and 24. These controls are known to those in the art and do not constitute a part of this invention. However, as can be seen, the advantages achievable by the present invention can be enhanced by precise control of the scarfing tool using various microprocessor enhanced positioning means. By means of the second hydraulic means 24, it is possible to take advantage of the precision available from such state of the art controls.

Referring to FIGS. 7-9, another embodiment of the invention is described and shown in which like reference numerals are used to describe like components to those described with reference to FIGS. 2-6. In this embodiment, first and second hydraulic means 23' and 24', respectively, are positioned on opposite sides of thrust roller 20' in tool 15. Additionally, both of the associated pistons are aligned perpendicularily to the direction of travel of the welded tube. In this embodiment, first piston 26' contacts trust flange 41 of thrust roller 20' to force roller 20' against the inner surface of the tube. However, unlike thrust plate 25 of tool 15' shown in FIG. 2, flange 41 extends outwardly from roller 20' in a plane substantially parallel to the direction of travel of the welded tube. First and second means 23' and 24' are connected to a source of hydraulic fluid through conduit 32', Conduit 32' is connected to line 34 in impeder adaptor rod for final connection to hydraulic fluid source 14. The scrafing tool of this invention operates in substantially like fashion to tool 15 of the previous invention.

The arrangement of hydraulic means 23' and 24' are such that it is possible to retrofit certain existing tools to provide the advantages obtained by the present invention. These advantages are, therefore, available at an affordable cost by retrofit. While presently preferred embodiments of the invention have been shown and described, the invention may be otherwise embodied within the scope of the appended claims.

What is claimed is:

1. A scarfing tool for inside the tube scarfing comprising:
   a. an elongated body having a cutting tool mounted thereon and adapted for connection to an impeder rod said elongated body having an axis running therethrough and parallel therewith;
   b. first and second roller rotatably positioned at substantially opposing ends of said elongated body and adapted for contact with the inner surface of the tube to be scarfed;
   c. a thrust roller pivotably mounted on the side of said body opposite from said first and second rollers for positioning said cutting tool adjacent the area to be scarfed, said thrust roller being retracted inside the elongated body when not actuated;
   d. first and second hydraulic means having associated piston means, said first piston means contacting said thrust roller causing said thrust roller to pivot and press against the inside of the tube thus positioning said cutting tool adjacent the area to be scarfed when actuated, said first and second hydraulic means each having an axis parallel to the axis of the elongated body, with said first piston means moving in parallel to the axis of the elongated body when actuated;
   e. a biasing means connected to and biased against said second piston means; and
   f. a source of hydraulic fluid connected to said first and second hydraulic fluid means for actuating said first and second piston.

2. A scarfing tool as claimed in claim 1, wherein said cutting tool is positioned at the end of said elongated body opposite from said impeder rod and in substantial alignment with first and second roller.

3. A scarfing tool as claimed in claim 1, wherein said first and second hydraulic means are juxtaposed to each other.

4. A scarfing tool for inside the tube scarfing comprising:
   a. an elongated body having a cutting tool mounted thereon and adapted for connection to an impeder rod said elongated body having an axis running therethrough and parallel therewith;
   b. first and second roller rotatably positioned at substantially opposing ends of said elongated body and adapted for contact with the inner surface of the tube to be scarfed;

c. a thrust roller pivotably mounted on the side of said body opposite from said first and second rollers for positioning said cutting tool adjacent the area to be scarfed, said thrust roller being retracted inside the elongated body when not actuated;
d. first and second hydraulic means having associated piston means, said first piston means contacting said thrust roller causing said thrust roller to pivot and press against the inside of the tube thus positioning said cutting tool adjacent the area to be scarfed when actuated, said first and second hydraulic means each having an axis perpendicular to the axis of the elongated body, with said first piston means moving in parallel to the axis of the elongated body when actuated;
e. a biasing means connected to and biased against said second piston means; and
f. a source of hydraulic fluid connected to said first and second hydraulic fluid means for actuating said first and second piston.

5. A scarfing tool as claimed in claims 1 or 4, wherein said first and second hydraulic means are spaced apart.

6. A scarfing tool as claimed in claims 1, 4 or 3, wherein said biasing means comprises a coil spring.

* * * * *

UNITED STATES PATENT AND TRADEMARK OFFICE
CERTIFICATE OF CORRECTION

PATENT NO. : 4,682,921

DATED : July 28, 1987

INVENTOR(S) : LESTER J. BLAHO

It is certified that error appears in the above-identified patent and that said Letters Patent is hereby corrected as shown below:

Column 1, line 24, after "alignment" delete "been" and substitute therefor -- between --;

Column 1, line 35, after "welds" delete "," and substitute therefor -- . --;

Column 1, line 37, after "would" delete "provided" and substitute therefor -- provide --;

Column 1, line 50, after "present" insert -- invention --;

Column 1, line 53, after "and" delete "exert" and substitute therefor -- exerts --;

Column 2, line 30, after "and" delete "secnd" and substitute therefor -- second --;

Column 2, line 64, after "respectively" delete "," and substitute therefor -- . --;

Column 3, line 15, after "weight" insert -- of --;

Column 3, line 40, after "second" delete "hydraulics" and substitute therefor -- hydraulic --;

Column 3, line 45, after "to" delete "linen" and substitute therefor -- line --;

Column 4, line 7, after "32" delete "," and substitute therefor -- . --; and

Column 4, line 9, after "The" delete "scrafing" and substitute therefor -- scarfing --.

Signed and Sealed this

Seventh Day of June, 1988

Attest:

DONALD J. QUIGG

*Attesting Officer*  *Commissioner of Patents and Trademarks*